Nov. 25, 1952     B. C. BARTON ET AL     2,619,431

RUBBER TREATMENT AND ARTICLE

Filed March 25, 1949

INVENTORS
BERNARD C. BARTON
EDWARD E. AUER
BY
Robert J. Patterson
ATTORNEY

Patented Nov. 25, 1952

2,619,431

UNITED STATES PATENT OFFICE 2,619,431

RUBBER TREATMENT AND ARTICLE

Bernard C. Barton, Clifton, and Edward E. Auer, East Orange, N. J., assignors to United States Rubber Company, New York, N. Y., a corporation of New Jersey Application March 25, 1949, Serial No. 83,422

8 Claims. (Cl. 117—47)

1

This invention relates to a method of treating vulcanized rubber articles and to improved vulcanized rubber articles obtained thereby. More particularly, this invention relates to a method of surface treating vulcanized rubber articles which are to be used in connection with processes of manufacturing other vulcanized rubber articles.

A principal object of the present invention is to provide a method of altering the surface characteristics of vulcanized rubber articles to prevent the deterioration of said articles when exposed to elevated temperatures in contact with a vulcanizable rubber body.

Another object is to prevent surface cracking of vulcanized rubber belts and the like, which are repeatedly exposed in service to the deteriorating effects of heat in the presence of sulfur.

Still another object is to provide a method of protecting vulcanized rubber surfaces from embrittlement by contact with a vulcanizable composition at elevated temperature, without adversely affecting the vulcanizing characteristics of said vulcanizable composition.

It is also an object of the invention to treat vulcanized rubber articles by a method which accomplishes the foregoing objects but is not deleterious to the physical properties of the article.

A further object of the invention is to provide a method of treating vulcanized rubber articles so as to accomplish the foregoing objects without presenting any fire hazard or dangerous toxicity hazard in the factory.

Figure 1:
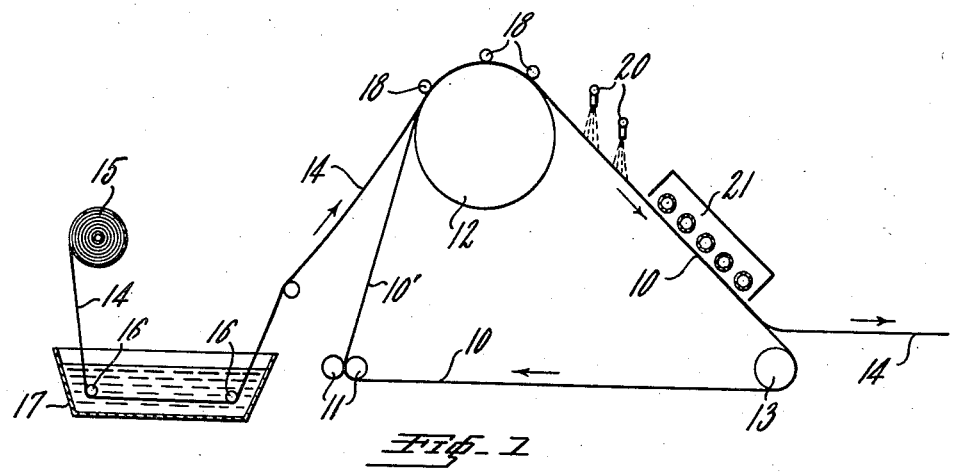
Figure 2:
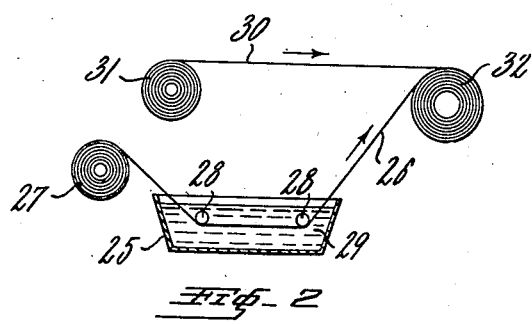
Figure 3:
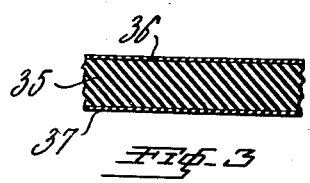

The problem which it is an object of the present invention to solve arises particularly in connection with certain processes for manufacturing rubberized elastic fabric, such as is illustrated in Fig. 1 of the accompanying drawing which is a largely diagrammatic representation of an apparatus for assembling a rubber-fabric composite article and vulcanizing same in contact with a vulcanized rubber belt, Fig. 2 of the drawing represents a preferred method of treating the said vulcanized rubber belt according to the present invention, and Fig. 3 is a cross-sectional view of the vulcanized belt after subjection to the treatment of our invention.

Referring to Fig. 1 of the drawing, a vulcanized endless rubber belt 10 is shown in a machine for manufacture of rubberized elastic fabric. The belt 10 is soft and elastic. The purpose of this belt is to serve as a carrier for conveying the fabric 14 to be rubberized and for causing the

2 fabric 14 to assume a condensed or contracted state before it is rubberized, so that the final rubber treated fabric will be highly extensible. The belt 10 passes through a pair of driven pinch rolls 11, and thence around a revolving drum 12, and thereafter around a roller 13. The drum 12 is driven at a somewhat faster speed than the pinch rolls 11, so that the section 10' of the belt 10 between the pinch rolls 11 and the drum 12 is in tension. As the belt passes around the drum 12, it contracts gradually and the tension is relieved.

A textile cloth 14 from which it is desired to make a highly elastic fabric passes from a supply roll 15 and under rollers 16 immersed in water or other liquid contained in a trough 17. The wet fabric 14 then passes upwardly and is applied to the tensioned section 10' of the belt 10 as it passes around the drum 12. The wet fabric is pressed firmly against the belt by floating and free-running rollers 18. The effect of this is to cause the wet fabric 14 to adhere to the stretched underlying belt 10, and since this belt is permitted to contract gradually as it approaches the point where it leaves the drum 12, the fabric will be condensed by the contraction of the belt to which it adheres as a result of its wet condition. That is, the adjacent parts of the fabric 14 will be crowded more closely together.

The condensed fabric 14 and underlying vulcanized rubber belt 10 passes beneath spraying nozzles 20 which serve to spray upon the fabric 14 a vulcanized rubber-containing fluid, usually latex. This latex saturates or impregnates the fabric 14. The latex-treated fabric 14 then passes a heating element 21 which dries and vulcanizes the latex in and on the condensed fabric. The treated fabric 14 is thereafter removed from the rubber belt 10 and is taken up or further treated by suitable means (not shown). The belt 10 continues around the roller 13 and through the pinch rolls 11 to receive more fabric to be treated. The rubberized fabric manufactured in this way is highly extensible. Processes of this type in which rubberized fabric is vulcanized in contact with a vulcanized rubber belt, are known to the art. Our invention is applicable to the treatment generally of vulcanized rubber articles, typified by these rubber belts, which in service come into contact with sulfur-containing vulcanizable compositions at elevated temperatures with a resulting normal tendency to rapid deterioration of the articles.

In this process, the endless vulcanized rubber belt 10 is repeatedly subjected to vulcanizing temperatures of, for example 210° to 240° F. as it passes before the heater 21. At the same time the vulcanized belt is in contact with the vulcanizable latex composition which contains sulfur. Some of the sulfur migrates from the latex into the surface of the vulancized rubber belt. This repeated exposure of the vulcanized belt to elevated temperatures and migratory sulfur from the latex results, after a relatively brief period of service, in over-vulcanization of the surface of the belt with consequent embrittlement and cracking of the surface. This over-vulcanization in the presence of heat and migratory sulfur is possible because the vulcanized rubber contains a vulcanization accelerator and zinc oxide or an equivalent combined zinc activator of sulfur vulcanization, such as zinc soaps, for example, zinc stearate and the like, which were put into the rubber compound during manufacture of the belt to activate the vulcanization thereof. The tendency of the belt to crack under these conditions is greatly accentuated by the fact that the belt is repeatedly subjected to considerable tension. When this embrittlement and cracking occur, the belt is no longer useful for its purpose and the process must be interrupted and the belt removed and discarded, and replaced by a new belt, which deteriorates in the same way after a short period of use.

Thus, the embrittlement and cracking of the vulcanized rubber belt by the action of heat in contact with a vulcanizable rubber composition occasions considerable inconvenience and waste of material, and consequently adds greatly to the cost of manufacturing the highly elastic fabric. For many years the art has been unable to remedy this situation.

According to the present invention, we have found that deterioration of the vulcanized rubber belt under the conditions described can be prevented by contacting the vulcanized rubber belt, prior to subjecting it to such conditions, with an alpha-mono-halogenated or an alpha, alpha-di-halogenated lower aliphatic saturated monocarboxylic acid wherein the halogen is bromine or chlorine. We have discovered that exposure of the rubber belt to such a halogenated acid for a sufficient period of time results in a change in the character of the surface layers of the belt whereby the belt is rendered immune to the deteriorating effect of migratory sulfur at elevated temperatures for extended periods of service without deleteriously affecting the vulcanization of vulcanizable compositions in contact with the belt as described above. The protection afforded by our treatment is believed to be due to the fact that the aforementioned acids react with the zinc oxide or equivalent combined zinc activators and zinc bearing accelerators in the outer layers of the vulcanized rubber in a manner preventing the combination of sulfur and consequent over-vulcanization of the surface layers when the rubber is subsequently heated in the presence of a composition containing migratory sulfur.

We have found that this treatment with certain halogenated monocarboxylic acids can be carried out without adversely affecting the physical properties of the belt, provided that the vulcanized rubber belt contains less than 25 parts of zinc oxide or equivalent combined zinc activator per 100 parts of rubber. If the belt contains 25 parts or more of zinc oxide or its equivalent per 100 parts of rubber, the halogenated acid treatment results in development of a loggy, inelastic condition in the belt, on simple exposure to heat, even in the absence of migratory sulfur. The compound from which the belt is made must contain at least a small amount of zinc oxide or equivalent combined zinc activator, say 1 part per 100 parts rubber, to activate the vulcanization of the compound. Thus the articles treated generally contain at least 1% but less than 25% of zinc oxide or equivalent combined zinc activator based on the rubber.

That these halogenated acids have the ability to penetrate the belt at a useful rate and form a protective layer even in the absence of a rubber solvent or swelling agent such as benzene is an unexpected discovery. By enabling the use of an aqueous solution of the acid or use of the undiluted acid itself instead of requiring a solution thereof in benzene or the like, our invention eliminates the great fire hazard and dangerous toxicity hazard presented by the use of such a solvent or swelling medium.

In carrying out the invention, we maintain the surface of the vulcanized rubber belt in contact with the halogenated acid for an extended period of time. The said acid is preferably applied to the vulcanized rubber surface in the form of a concentrated aqueous solution, although the undiluted halogenated acid may be used if it is a liquid at the temperature of the treatment.

Fig. 2 of the drawing shows a preferred method of carrying out the treatment of a vulcanized rubber belt with an aqueous solution of the halogenated organic acid. The treating solution 29, for example a solution of 100 parts by weight of monochloracetic acid in 150 parts of water, is contained in a suitable trough 25. A cloth liner 26 such as a loosely woven cotton cloth is passed from the roll 27 under rollers 28 immersed in the treating solution 29 in the trough 25, thereby saturating the cloth with the treating solution. The vulcanized rubber belt 30 to be treated is fed from a roll 31 and is wound up with the saturated cloth liner on a roll 32. The belt and cloth liner are permitted to remain in contact in this wound condition for a sufficient length of time for the halogenated organic acid to diffuse from the aqueous solution in the cloth liner into the surface layers of the vulcanized rubber belt and effect the desired penetration and treatment. A suitable length of time for this to occur is, for example, about 48 hours, during which time the characteristics of the surface layers of the vulcanized belt will have been altered to a depth of about 0.020 inch. The excess acid may be rinsed off before the belt is used.

Fig. 3 represents the appearance of a cross-section of a portion of the vulcanized belt after it has been subjected to the above treatment. The interior portion 35 of the belt remains unaltered and retains its original opaque appearance due to the presence of zinc oxide. However, the outer layers 36 and 37 of the improved belt, wherein the halogenated organic acid has reacted with a considerable amount of the zinc oxide, take on a distinctly different appearance, typically becoming dark in color and somewhat translucent compared to the unaltered interior portion 35. The exact nature of the change in appearance of the treated surface layers will vary somewhat, depending on whether or not the rubber compound contains carbon black, pigments, etc., but in all cases the treated surface layers will be observed to have a distinctly different color or reflectivity, compared to the inner untreated part of the belt. This visible change can be observed by cutting a very small transverse section from the end of the belt.

After this treatment, the vulcanized belt can be used in service for extended periods in the manner described above without any embrittlement or cracking. The so-treated vulcanized belt has been found to have a useful production life five or more times longer than the useful life of a similar but untreated vulcanized belt. After using the belt in service for an extended period of time, the treatment with halogenated acid may be repeated to renew the resistance of the belt to the deteriorating effects of migratory sulfur. Thus, the improved belt makes possible more convenient and economical production of elastic fabrics, without in any way affecting the vulcanization of same. The process of making the improved belt can be carried out easily with simple equipment, without any fire hazard or dangerous toxicity hazard.

The preferred halogenated organic acid used in producing the improved belt is monochloroacetic acid. Others which may be used include alpha-chloropropionic, alpha-bromopropionic, alpha-bromobutyric, alpha-bromocaproic, alpha, alpha-dichloroacetic, alpha,alpha-dichloropropionic, alpha,alpha-dibromocaproic acids.

Those halogenated acids which are liquid at room temperature may, if so desired, be applied directly to the belt to be treated without prior solution in water. If an aqueous solution of the halogenated acid is employed, the solution is preferably made as concentrated as convenient, as the time of treatment is thereby shortened. Solutions of 50 to 200 parts by weight of halogenated acid per 100 parts of water are usually employed, although in the case of those halogenated acids which are infinitely miscible with water, even more concentrated solutions may be employed, up to and including the pure halogenated acid when the latter is a liquid or is readily liquifiable at the temperature of the treatment. If desired, more dilute solutions, e. g., 10 parts by weight of halogenated acid per 100 parts of water may be used, but it will be understood that the more dilute the aqueous solution, the longer is the time required for an equivalent depth of alteration of the vulcanized surface being treated. Thus, there is no threshold value of the concentration of the aqueous halogenated acid solution employed, and the time of treatment and concentration of the solution are interrelated.

The treatment of the vulcanized surface with the halogenated acid is continued until the rubber has been penetrated and altered in appearance to a substantial depth, that is, to a depth sufficient to give whatever degree of protection from embrittlement is desired for the particular service conditions to which the rubber will be subjected in use. The thickness of the altered surface layer may be directly proportional to the severity of the service conditions encountered, and inversely proportional to the frequency of renewal of the protection which is contemplated. Thus for mild service or where frequent re-treatment is intended, alteration of an extremely thin surface layer is sufficient. On the other hand, for severe service or where infrequent renewal of protection is desired, alteration of a relatively thick surface layer will be desirable. Usually it will be found satisfactory to continue the treatment until at least the outer 0.005 inch of the rubber has been rendered partially translucent by the halogenated acid. Such penetration may be obtained, for example, by treating for about 6 hours with a solution of 700 parts by weight of monochloroacetic acid in 1000 parts of water. Such treatment is effective to prolong the service life of the treated belt many times compared to that of an untreated vulcanized belt. Of course, the treatment may be prolonged until a greater depth, or even the entire belt, has been affected, but in practice it is found unnecessary to do so.

The treating process of this invention does not require elevated temperatures, and is most conveniently carried out at room temperatures. However, elevated temperatures may be employed if desired; e. g., a solid halogenated acid such as monochloroacetic acid may be melted and painted on the belt in liquid form. This acid melts at about 60° C. The liquid acid may be painted on, e. g., with an acid resistant paint brush, or sprayed on while melted. Several coats may be applied if desired. It is preferable to heat the painted (or sprayed) belt for ½ hr. at 90–100° C. after each application, to facilitate penetration of the belt by the acid. Three coats (painted on, with oven treatment between each coat) cause formation of a protective layer about 0.015 inch thick.

The belt can be soaked in the melted acid. In this case, penetration is rapid, both because of the concentration, and the elevated temperature. A protective layer 0.015 inch thick may be formed in 2 to 3 hours. Any excess halogenated acid may then be rinsed off before the belt is to be used.

The thus treated belt can be used in service in contact with migratory sulfur at elevated temperatures for extended periods without any tendency to become brittle. By repeating the halogenated acid treatment occasionally the belt can be used indefinitely without embrittlement.

*Example*

The following formulation was cured by heating for 45 minutes in a mold heated with steam under 40 p. s. i. pressure:

|  | Parts by wt. |
|---|---|
| Smoked sheet | 100 |
| Zinc oxide | 5 |
| Tetramethyl thiuram disulfide | 3 |
| Antioxidant | 3 |
| Filler | 27 |

This produced a soft, elastic vulcanizate. The resulting vulcanizate was treated for various times by soaking in a solution of 800 parts of monochloroacetic acid in 1000 parts of water. Visual inspection of cross-sections of the treated vulcanizates showed that protective surface layers of varying thickness had been formed as follows:

| Time of Treatment | Depth of Penetration |
|---|---|
|  | *Inches* |
| 16 hours | .012 |
| 48 hours | .022 |
| 136 hours | .030 |

Samples of the vulcanizates were covered with powdered sulfur and placed overnight in an oven heated at 100° C. The treated samples were in good condition after this exposure to sulfur and heat, but a similar untreated sample was embrittled and could not be flexed without cracking.

While the example shows treatment of a vulcanizate of natural rubber, our invention is applicable to soft elastic vulcanized rubber articles made from any sulfur-vulcanizable elastic rubber such as butadiene-styrene rubbery copolymers, butadiene-acrylonitrile rubbery copolymers, etc.

This application is a continuation-in-part of our pending application, Serial No. 74,584, filed February 4, 1949, and now abandoned, and assigned to the same assignee as the present application.

Having thus described our invention, what we claim and desire to protect by Letters Patent is:

1. A method of treating a vulcanized soft rubber article, containing less than 25 parts of a combined zinc activator of sulfur vulcanization per 100 parts of rubber intended for service in contact with sulfur-vulcanizable rubber compositions at elevated temperatures, comprising contacting said article with an aqueous organic acid selected from the group consisting of alpha-mono-halogenated and alpha,alpha-di-halogenated lower aliphatic saturated monocarboxylic acids wherein the halogen is selected from the group consisting of chlorine and bromine, for a period of time sufficient to permit alteration in appearance of a surface layer thereof at least about 0.005 inch thick by the said acid, whereby the article is rendered capable of resisting embrittlement and cracking for extended periods of service in contact with sulfur-containing vulcanizable rubber compositions at vulcanizing temperatures.

2. The method of claim 1 wherein said organic acid is in the form of an aqueous solution of from 50 to 200 parts by weight of said acid per 100 parts of water.

3. A method as in claim 1 in which the acid is monochloroacetic acid.

4. A method as in claim 1 in which said acid is monochloroacetic acid and is applied to said article in the form of an aqueous solution of from 50 to 200 parts by weight of said acid per 100 parts of water.

5. A method as in claim 1 in which the acid is dichloroacetic acid.

6. A method as in claim 1 in which the acid is alpha-bromopropionic acid.

7. A method of treating a vulcanized soft rubber belt, containing less than 25 parts of a combined zinc activator of sulfur vulcanization per 100 parts of rubber which comprises winding up said belt with a cloth liner containing an aqueous solution of a halogenated organic acid selected from the group consisting of alpha-mono-halogenated and alpha,alpha-di-halogenated lower aliphatic saturated monocarboxylic acids wherein the halogen is selected from the group consisting of chlorine and bromine, and maintaining the belt and liner in wound-up condition for a period of time sufficient for said halogenated organic acid to diffuse from said aqueous solution into a surface layer of the belt, whereby the said vulcanized belt is protected from embrittlement by subsequent exposure to migratory sulfur at elevated temperature.

8. A soft vulcanized rubber article containing less than 25 parts of a combined zinc activator of sulphur vulcanization per 100 parts of rubber made by the method of claim 1 and characterized by having a surface layer capable of resisting embrittlement and cracking for extended periods of service in contact with sulphur-containing vulcanizable compositions at vulcanizing temperatures.

BERNARD C. BARTON.
EDWARD E. AUER.

REFERENCES CITED

The following references are of record in the file of this patent:

UNITED STATES PATENTS

| Number | Name | Date |
| --- | --- | --- |
| 218,842 | Wattles | Aug. 26, 1879 |
| 1,642,018 | Fisher | Sept. 13, 1927 |
| 1,844,943 | Cadwell | Feb. 16, 1932 |
| 1,871,037 | Cadwell | Aug. 9, 1932 |
| 1,988,448 | Hopff et al. | Jan. 22, 1935 |
| 2,015,165 | Twiss et al. | Sept. 24, 1935 |
| 2,032,941 | Linscott et al. | Mar. 3, 1936 |
| 2,234,611 | Trumbull | Mar. 11, 1941 |
| 2,446,536 | Hardy | Aug. 10, 1948 |